June 19, 1934. S. SANDELOWSKY ET AL 1,963,868

ARC WELDING

Filed March 21, 1932

Inventors:
Sally Sandelowsky,
Karl Belling,
by Charles E. Tullar
Their Attorney.

Patented June 19, 1934

1,963,868

UNITED STATES PATENT OFFICE 1,963,868

ARC WELDING

Sally Sandelowsky, Hennigsdorf, and Karl Belling, Berlin, Germany, assignors to General Electric Company, a corporation of New York Application March 21, 1932, Serial No. 600,340
In Germany March 26, 1931

7 Claims. (Cl. 219—8)

Our invention relates to arc welding and more particularly to apparatus for automatically performing arc welding operations.

It is an object of our invention to provide improved means for rotating the welding electrode and simultaneously feeding it toward the work at a proper rate of speed to maintain during the welding operation a welding arc of proper length and voltage.

It is a further object of our invention to combine with our improved feeding mechanism means for magnetically controlling the welding arc to steady it and prevent it from being deflected or blown out during the welding operation. Our improved magnetic control forms the subject matter of our divisional application, Serial No. 700,130, filed November 28, 1933, for Arc welding.

Figure 1:
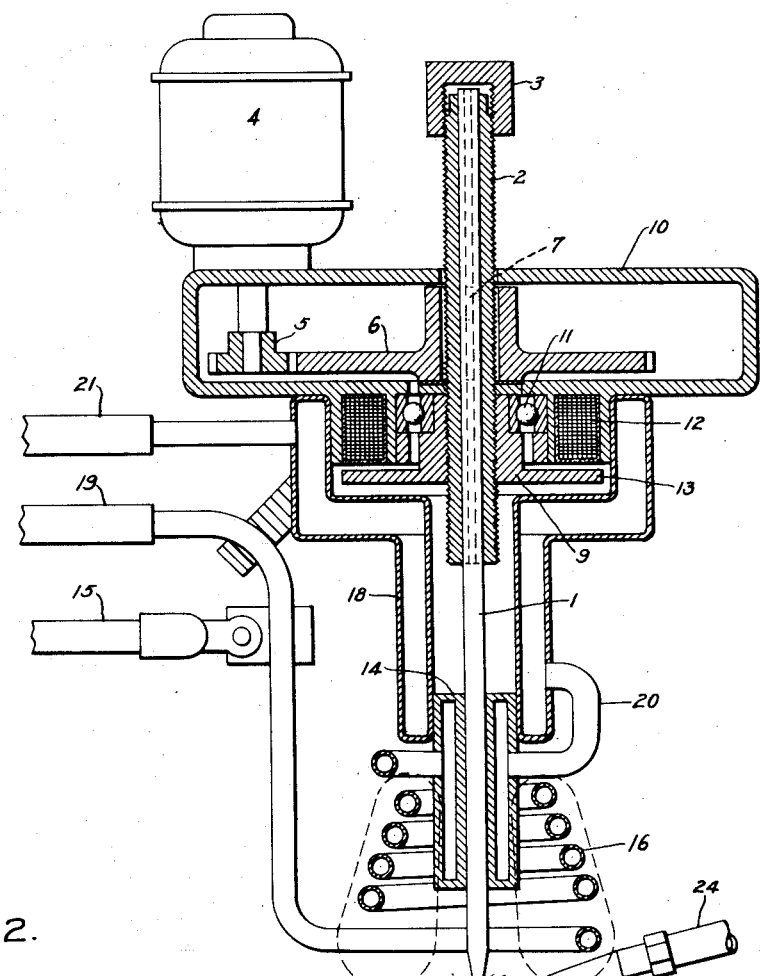
Figure 2:
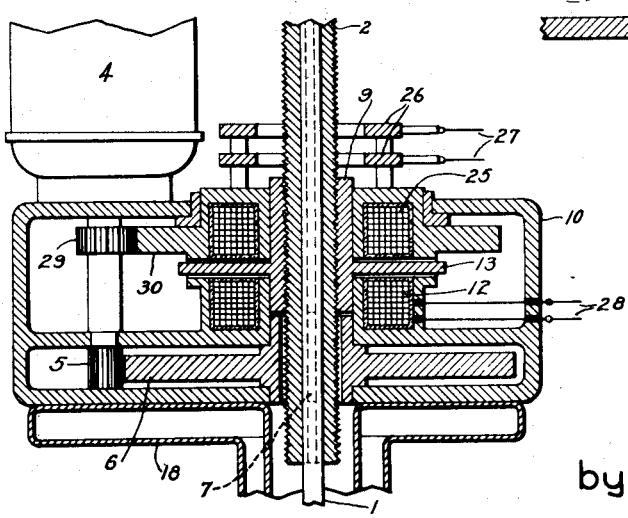

Further objects of our invention will become apparent from a consideration of the following specification describing two embodiments thereof illustrated in Figs. 1 and 2 of the accompanying drawing.

In the drawing Fig. 1 is a view partly in section of a welding head embodying our improved feeding mechanism, improved magnetic control, and means for cooling the same and protecting it from the action of the welding arc, and Fig. 2 is a fragmentary view of a welding head such as illustrated in Fig. 1 showing a modified feeding mechanism in accordance with our invention.

Referring to Fig. 1 the electrode 1 which, is preferably a carbon electrode or an electrode of the non-consuming type, is supported in a hollow screw 2 hereinafter referred to as a spindle. It is clamped in the spindle by means of a nut 3, although other means may be provided for attaching it thereto. The spindle is rotated by an electric motor 4 with which it is mechanically connected through gears 5 and 6. The connection between gear 6 and the spindle is obtained through a groove and key 7 so that the spindle is free to move through the gear but is held against rotation relative thereto. Supported on and normally rotating with the spindle is an internal screw 9 hereinafter referred to as a nut. This nut is supported in a housing 10 by means of a ball bearing 11. This housing also serves to enclose gears 5 and 6 and acts as a support for an electromagnet 12 which may, as illustrated in the figure, be formed integral therewith. Nut 9 is provided with a disklike portion 13 located opposite to and constituting an armature for an electromagnet which is energized in accordance with a characteristic of the arc so that its energization increases and decreases with an increase or decrease in the length of the welding arc. The energization of the electromagnet may be controlled in accordance with any characteristic of the welding circuit, but is preferably controlled in accordance with the current or voltage thereof. The electromagnet may be connected directly in the welding circuit, or its energization may be controlled by means associated with the welding circuit. Such arrangements are old in the art and constitute no part of our present invention.

Current is supplied to the electrode near its arcing terminal through a hollow sleeve 14 which is connected to one terminal of a source of supply through conductors 15 and 16. Conductor 16 is preferably formed in a spiral which encloses sleeve 14 and tapers in a direction away from the arcing terminal of the electrode. The flow of current through this spiral conductor generates a powerful electric field which increases in strength upwardly, due to its conical arrangement. Sleeve 14 is preferably made of magnetic material in order to concentrate the flux about the electrode. This flux has a steadying effect on the welding arc and prevents it from being deflected or blown out during the welding operation.

Sleeve 14 and conductor 16 are preferably made hollow and cooled by circulating therethrough a suitable cooling medium such as water. A water jacket 18 is also interposed between the welding arc and the feeding mechanism in order to protect it from the heat of the arc. The cooling medium is supplied through pipe 19, conductor 16, sleeve 14, pipe 20 and jacket 18 from which it is discharged through a pipe 21. This cooling permits a compact arrangement of parts being employed as well as the location of spiral conductor 16 and sleeve 14 very close to the arcing terminal of the electrode.

Additional material may be added to the seam during welding by supplying thereto a welding wire 23 which may be automatically fed into the arc through a nozzle 24 by means of a feeding mechanism (not shown). Preferably, the nozzle 24 and the welding wire 23 are electrically insulated from the welding head and from the rest of the machine frame in order to prevent the arc from striking over to the welding wire and forming an arc between the welding wire and the electrode.

The mechanism above described operates as follows: An arc is established between the electrode 1 and the work 17 by means of a piece of carbon or the like. If the arc is of the proper length, the electromagnet 12 will not act on the armature 13 of the nut 9 and no feeding action will be obtained. The electrode, however, will be rotated at a constant rate of speed by the motor 4 and the arc at the terminal of the electrode will be stabilized by this rotation and by the magnetic influence of the field generated by the welding current flowing through spiral coil 16. If the arc length becomes too great the electromagnet 12 will be energized attracting thereto armature 13 of the nut 9 and holding it against rotation. With the nut 9 thus prevented from rotating, the spindle 2 is fed therethrough by reason of the threaded engagement of these two members. As soon as the arc length attains a normal value, the electromagnet 12 will be deenergized, again permitting nut 9 to rotate with spindle 2 and thus preventing further feeding of the electrode toward the work. It is of course apparent that rotation of the nut 9 need not be arrested since a feeding action may be obtained if its rate of rotation be decreased relative to the rate of rotation of spindle 2. Consequently, the braking effect of the magnet 12 on the disk 13 before these two members are brought into engagement will be effective and may be used for feeding the electrode toward the work.

By suitably modifying the arrangement shown in Fig. 1 means may be provided for feeding the electrode into engagement with the work and thereafter withdrawing it to strike an arc after which a proper feeding of the electrode toward the work is obtained for maintaining the welding arc at its desired operating value. Such an arrangement is shown in the modification illustrated in Fig. 2. In this figure parts corresponding in function to those in Fig. 1 have been designated by like reference numbers. An additional rotating magnet 25 is employed in the arrangement illustrated in Fig. 2. Current is supplied to the winding of this electromagnet through slip rings 26 which are connected through conductors 27 to a suitable source of supply. The winding of magnet 12 is connected to a suitable source of supply through conductors 28. As in Fig. 1 magnet 12 is stationary but magnet 25 is rotated in the same direction as spindle 2 but at a higher rate of speed through gears 29 and 30. Gear 29 is supported on the same shaft as gear 5 and simultaneously driven therewith by motor 4 which may be supported on the housing 10 as illustrated. By any suitable means responsive to a characteristic of the welding circuit, such as arc length and voltage, electromagnet 12 is energized when the arc is too long and electromagnet 25 energized when the arc is too short.

The operation of the arrangement illustrated in Fig. 2 is as follows: Upon completing the welding circuit magnet 12 will be energized due to the high voltage between the electrode and the work. The energization of magnet 12 will arrest the rotation of nut 9 and occasion a feeding motion of electrode 1 and spindle 2 toward the work. When the electrode engages the work, electromagnet 12 will be deenerized and electromagnet 25 energized. Upon the energization of electromagnet 25 a reverse feeding operation is obtained until an arc length of normal voltage is established. Thereafter, the electromagnet 12 is periodically energized in order to feed the electrode toward the work and compensate for its consumption in the arc. Should an obstruction be encountered during the welding operation the arrangement just described will operate to withdraw the electrode a sufficient amount to traverse this obstacle at the same time maintaining the welding arc at proper length and voltage. Consequently, the arrangement shown in Fig. 2 is particularly suitable for welding irregular seams.

While we have shown and described two particular embodiments of our invention, it is apparent that various modifications and variations may be made without departing from the spirit and scope thereof. For example, the construction and arrangement of the electromagnets may be different from that illustrated and both of these magnets in an arrangement such as shown in Fig. 2 may be rotated in order to accomplish a proper feeding of the electrode. It is also apparent that in place of non-consuming electrodes for which the apparatus is particularly suited, consuming electrodes may be used without departing from our invention. It is also apparent that either the internal screw or the external screw may be positively rotated and the rotation of the remaining screw controlled in order to control the feeding of the welding electrode.

What we desire to secure by Letters Patent of the United States is:—

1. Arc welding apparatus comprising an internal screw and an external screw one of which is supported on the other and normally rotated therewith, means for rotating one of said screws, means for attaching an electrode to said screw, and means responsive to a characteristic of the welding arc for controlling the rotation of said other screw.

2. Arc welding apparatus comprising an externally threaded spindle, means for supporting an electrode on said spindle, means for rotating said spindle, a nut for said spindle supported thereon and normally rotated therewith, and means responsive to a characteristic of the welding arc for controlling the rotation of said nut.

3. Welding apparatus comprising an electrode holder having a threaded spindle, means for rotating said spindle, and nut threaded on said spindle and rotatable therewith, and means responsive to a characteristic of the welding arc for controlling the rotation of said nut and the rate of feed of said electrode.

4. Arc welding apparatus comprising a hollow externally threaded spindle, means for supporting an electrode in said spindle, means for rotating said spindle, a nut for said spindle supported thereon and normally rotated therewith, means including an electromagnet for controlling the rotation of said nut, and means for controlling the energization of said electromagnet in response to a characteristic of the welding arc.

5. Arc welding apparatus comprising a stationary annular electromagnet, a hollow externally threaded spindle extending through said electromagnet, means for supporting an electrode in said spindle, means for rotating said spindle, a nut supported on said spindle and normally rotated therewith having a portion thereof constituting an armature for said electromagnet movable into engagement therewith by the energization of said electromagnet, and means responsive to a characteristic of the welding arc for controlling the energization of said electromagnet and the rotation of said nut.

6. Arc welding apparatus comprising a plurality of relatively rotating annular electromagnets, an externally threaded spindle extending through said electromagnets, means for supporting an electrode on said spindle, means for rotating said spindle, a nut supported on said spindle and normally rotated therewith having a portion thereof constituting an armature for said electromagnets located between said electromagnets and movable into engagement with one or the other thereof when attracted thereto by the energization of said electromagnets, and means responsive to a characteristic of the welding arc for controlling the energization of said electromagnets.

7. Arc welding apparatus comprising an internal screw and an external screw one of which is supported on the other and normally rotated therewith, means for rotating one of said screws, means for attaching an electrode to said rotating screw, a plurality of electromagnets about said screw supported on and normally rotating with said rotating screw, means for rotating said electromagnets relative to one another, an armature for said electromagnets located between said electromagnets and movable into engagement with one or the other thereof when attracted thereto by the energization of said electromagnets, means for attaching said armature to the screw supported on and normally rotated with said rotating screw, and means responsive to a characteristic of the welding arc for controlling the energization of said electromagnets.

SALLY SANDELOWSKY.
KARL BELLING.